United States Patent
Cordes

[15] 3,656,997
[45] Apr. 18, 1972

[54] COATED GELATIN CAPSULES AND PROCESS FOR PRODUCING SAME

[72] Inventor: Gunter Cordes, Monheim, Germany
[73] Assignee: Sanol-Arzneimittel Dr. Schwarz GmbH, Monheim, Germany
[22] Filed: May 11, 1970
[21] Appl. No.: 36,458

[30] Foreign Application Priority Data

May 14, 1969 Germany ..................... P 14 24 647.0

[52] U.S. Cl. .................................. 117/73, 117/72, 117/85, 117/100 A, 117/141, 424/19, 424/32, 424/35, 424/94
[51] Int. Cl. ...................................... A61k 9/04, B44d 1/14
[58] Field of Search .................... 424/20, 19, 35, 32, 362, 94; 117/100 A, 100 C, 141, 72, 73, 85, 86

[56] References Cited

UNITED STATES PATENTS

| | | | |
|---|---|---|---|
| 2,540,979 | 2/1951 | Clymer et al. | 424/35 |
| 2,491,475 | 12/1949 | Bogin | 424/35 X |
| 2,789,920 | 4/1957 | Carstensen et al. | 117/141 X |
| 3,080,294 | 3/1963 | Shepard | 424/20 |
| 3,097,144 | 7/1963 | Banker | 117/72 X |
| 3,256,111 | 6/1966 | Singiser | 424/35 X |
| 3,361,632 | 1/1968 | Ross et al. | 424/20 |
| 3,362,881 | 1/1968 | Eberhardt et al. | 424/20 |

Primary Examiner—William D. Martin
Assistant Examiner—Ralph Husack
Attorney—Oberlin, Maky, Donnelly & Renner

[57] ABSTRACT

Gelatin capsules filled with an active ingredient or ingredients are protected against solution in the stomach in order that they may reach the intestines and be absorbed therein by providing said capsules with a primary lacquer containing a soluble film-forming colloidal material soluble both in water and in organic solvents and then with a lacquer unaffected by gastric juices and soluble in intestinal juices.

4 Claims, No Drawings

COATED GELATIN CAPSULES AND PROCESS FOR PRODUCING SAME

This invention relates to a process for the production of gelatin capsules which are unaffected by gastric juices and soluble in the small intestine.

Over recent years, the gelatin capsule has become one of the most popular forms of presentation for pharmaceutical preparations. One of its main advantages lies in the quick release of the active ingredients encapsulated in it attributable both to the high solubility of the gelatin shell and to the immediate release of the uncompressed active ingredients. Accordingly, the gelatin capsule, especially the hard gelatin oral capsule, is primarily used for medicaments which are intended to be released in the stomach immediately after they have been taken. In many cases, quick release is also desirable in the case of acid-sensitive substances, such as ferment preparations, especially pancreatin. In this case, the compression stage in the preparation of tablets and lozenges is accompanied by gradual decomposition or disintegration of the core so that the ferment activity is inadequately utilized. However, it has hitherto only been possible to a very limited extent to treat gelatin capsules with a view to making them resistant to gastric juices or to obtain capsules which are themselves unaffected by gastric juices. According to Czetsch-Lindenwald "Arzneikapseln" Editio Cantor 1962, page 82, there are basically three different methods by which capsules can be made resistant to gastric juices:

1. Subsequent hardening (maturing) of the gelatin shell;
2. Coating the capsules with coatings resistant to gastric juice
3. Incorporating substances which are unaffected by gastric juice in the gelatin shell or producing the shell of the capsule from substances which are resistant to gastric juices instead of from gelatin itself (in which case the capsules cease to become gelatin capsules).

All three methods have their weaknesses and involve precise control measures to ensure that the required effect is obtained.

The main disadvantage of resistance to gastric juices obtained by subsequently hardening the gelatin shell lies in the phenomenon of post-hardening during storage. P. Boymond, J. Sfiris and P. Amacker, Pharm. Industrie, 28, 836 (1966) state inter alia the following:

"Table 3 below shows the decomposition time of capsules which were washed twice for 1 minute in a 1 percent formalin solution and then dried at ambient temperature. It is clear from this Table that the decomposition time increases with longer storage. The test was carried out by the steel ball method. It is obvious that this method is inadequate for the production of usable capsules which are soluble in the small intestine."

In the table reproduced in the text of this publication, it is shown that the decomposition time of formalin-treated gelatin capsules in duodenal juice increases from 5 minutes to 1 hour 37 minutes after 18 months' storage.

In principle, coatings unaffected by gastric juices can be applied to gelatin capsules by methods similar to those used in the preparation of tablets and lozenges with coatings that are resistant to gastric juices. According to Czetsch-Lindenwald, loc. cit., one disadvantage is that although a film of only limited duration can be applied it still counteracts the effect of gastric juices on account of unfavorable storage storage conditions. Accordingly, hardening with formaldehyde is today the only effective method of preparing the soft gelatin capsules in such a way that they are unaffected by gastric juices.

However, it was also known among experts that these coatings have the serious disadvantage that their service life on gelatin capsules is very limited. As a result of the so-called "bean shell effect", cracks are formed in the coating which ultimately peals off. Accordingly, coating with lacquers is only suitable for small batches as used for example in short-term clinical tests.

Accordingly, the main difficulties in the coating of gelatin capsules lie in the formation of cracks, in the phenomenon of pealing ("bean shell effect") and in a non-uniform lacquer covering. It can be assumed that these phenomena emanate from the smooth surface of the capsule with which the lacquer subsequently applied forms only an inadequate bond. Our own tests and efforts to treat the surface of the capsules by spraying on water-alcohol mixtures with a view to improving adhesion of the following lacquer, did not produce the required result. The shell of the capsule softened, deformation occurred and encapsulated active ingredients showed losses of activity under the effect of moisture.

The process according to the invention for the production of transportable and storable gelatin capsules which are unaffected by gastric juices and soluble in the small intestine, is distinguished by the fact that conventional gelatin capsules non-resistant to gastric juices and filled with the active ingredient(s) are coated by spraying with a primary lacquer containing a soluble film-forming colloid completely or partly soluble both in water and in organic solvents or a mixture of several such colloids, and then as known per se with a lacquer unaffected by gastric juices. The primary lacquer is sprayed on, preferably, in a quantity of from 0.1 to 10 mg. per capsule.

Surprisingly, it has been found that in cases where the special primary or under lacquer according to the invention which in itself does not impart resistance to gastric juices is used, a following lacquer unaffected by gastric juices which does not have any of the disadvantage described above can be satisfactorily applied. The primary lacquer contains a film former which is completely or partly, preferably substantially completely, soluble both in organic solvents or in mixtures thereof and in water, or a mixture of several such film formers.

Examples of products suitable for the intermediate layer or primary lacquer include polyethylene glycol esters of higher fatty acids, preferably with a chain length of from $C_{12}$ to $C_{18}$; ethers of the polyethylene glycol sorbitan ester of higher fatty acids, preferably with a chain length of from $C_{12}$ to $C_{18}$; alkali metals salts of fatty alkyl sulfuric acid esters, preferably with a chain length in the fatty alkyl radical of from $C_{12}$ to $C_{18}$; carboxy vinyl polymers (also known as acrylic acid polymers) and cellulose ethers such as alkyl ethers or hydroxyalkyl ethers of cellulose alkylated to different degrees, especially cellulose methylether.

Polyvinyl pyrrolidones differing in their molecular size, preferably with a molecular weight of from $10^4$ to $10^6$, or hydroxy methyl propyl cellulose or mixtures of both substances, are preferably used as substances of this kind.

To demonstrate the advantages which the capsules unaffected by gastric juices prepared by the process according to the invention have, 300 g of the capsules produced by this process and 300 g of capsules coated solely with the cellulose acetate phthalate lacquer of otherwise the same composition in the absence of a primary lacquer, were introduced each together with 450 g of lozenges whose object was to increase the load of the preparation into a tetrahedron mixer with an edge length of approximately 30 cm and the mixer run at a speed of approximately 15 revolutions per minute. After 2 hours, the capsules were removed and compared with one another.

It was found that, in almost all the capsules prepared in the absence or the primary lacquer, the lacquer had become detached from the surface of the capsule, while in the capsules prepared by the process according to the invention, this phenomenon only occurred in about 1 to 2 percent of the capsules. Accordingly, a test subsequently carried out to determine resistance to gastric juices only gave satisfactory results in the case of the capsules produced by the process according to the invention.

In a second test, capsules coated by this process with a lacquer unaffected by gastric juices and capsules coated solely with a cellulose acetate phthalate lacquer of otherwise the same composition, i.e. without a primary lacquer, were stored for 14 days at 40° C. in an incubator. A test conducted afterwards showed that the lacquer film on capsules prepared in the absence of a primary lacquer was easily removed mechanically since it had become detached from the capsule, while this phenomenon did not occur in the capsules prepared by the process according to the invention.

The invention is illustrated by the following examples. The use of pancreatin as a filling for the capsules is purely exemplary. Any other active ingredients may also be used to fill the gelatin capsules.

EXAMPLE 1

Fifty kg of pancreatin-filled hard gelatin capsules "snap fit size 0" were initially coated with the following solution:

| | |
|---|---|
| cellulose acetate phthalate | 0.13 kg |
| polyvinyl pyrrolidone (molecular weight approx. 25,000) | 0.028 kg |
| alcohol | 5.5 liters |
| methylene chloride | 5.5 liters |

A solution of the following composition was then applied:

| | |
|---|---|
| cellulose acetate phthalate | 2.25 kg |
| beeswax | 0.175 kg |
| 1,2-propylene glycol | 0.175 kg |
| 1,5-sorbitan mono-oleate | 0.175 kg |
| methylene chloride | 25 liters |
| alcohol | 25 liters |

EXAMPLE 2

Fifty kg of pancreatin-filled hard gelatin capsules "snap fit size 0" were initially coated with the following solution:

| | |
|---|---|
| cellulose acetate phthalate | 0.195 kg |
| hydroxymethyl propyl cellulose | 0.078 kg |
| alcohol | 5.5 liters |
| methylene chloride | 5.5 liters |

A solution of the following composition was then applied:

| | |
|---|---|
| cellulose acetate phthalate | 2.25 kg |
| beeswax | 0.175 kg |
| 1,2-propylene glycol | 0.175 kg |
| 1,5-sorbitan mono-oleate | 0.35 kg |
| alcohol | 25 liters |
| methylene chloride | 25 liters |

EXAMPLE 3

Fifty kg of pancreatin-filled hard gelatin capsules "snap fit size 0" were initially coated with the following solution:

| | |
|---|---|
| cellulose acetate phthalate | 0.195 kg |
| polyvinyl pyrrolidone | 0.03 kg |
| hydroxymethyl propyl cellulose | 0.04 kg |
| alcohol | 4.4 liters |
| methylene chloride | 5.5 liters |

The procedure was then as in Example 2.

EXAMPLE 4

Fifty kg of filled hard gelatin capsules "snap fit size 0" were initially coated with the following solution:

| | |
|---|---|
| cellulose acetate phthalate | 0.13 kg |
| carboxy vinyl polymer (molecular weight approximately 2×10⁶) [CARBOPOL 934, a product of Goodrich] | 0.03 kg |
| alkyl alcohol | 5.5 liters |
| methylene chloride | 5.5 liters |

The procedure was then as in Example 2.

Testing of the capsules produced in accordance with the invention to determine their resistance to gastric juices was carried out with an artificial gastric juice according to USP XVII of the following composition (pH 1.2): 0.2 g of NaCl, 0.32 g of pepsin, 0.7 mL of HCL (35–38% w/w), and water to give a total volume of 100 mL., and with an artificial gastric juice of pH 3 identical in composition with that of pH 1.2, except that the quantity of HCL was reduced to such an extent that the pH value amounted to approximately 3.0. This second form of gastric-juice test was used because it is apparent from investigations by Andersson, S, Handbook of Physiology, Section VI, Vol. II, p. 865, Am. Physiolog. Soc. Washington D.C. 1967 that, especially after meals, the actual conditions prevailing in the stomach are not quite so acid.

The period of treatment with artificial gastric juice in the following tests was 2 hours and in some cases 1 hour, too, because investigations by Griffith G.H. et al., Gastroenterology 54, 1 (1968) on human beings have shown that an average it takes 55 minutes ($\pm$ 15 minutes) to empty the stomach.

Testing for resistance to gastric juices was carried out by inspecting the contents of the capsule. After 2 hours' treatment with gastric juice of pH 1.2 at 37° C., all 10 capsules used for the test were opened. The contents of the capsules did not show any signs of moisture having penetrated.

An artificial duodenal juice of the following composition was used to test the capsule opening after passing through the stomach: 0.68 g of $KH_2PO_4$, 1.0 g of pancreatin, NaOH q.s., ad 100 ml. of water.

Sodium hydroxide was used in such a quantity that the pH-value amounted to 7.5.

The capsules were introduced into artificial duodenal juice of pH 7.5 and then spun round at 37° C. in a resorption apparatus. After an average of 12 minutes, the capsules began to open at one end, the entire contents of the capsule having been released after 20 to 25 minutes. Release of the pancreatin in the capsules can also be established by determining the lipase activity of the treatment liquid.

I claim:

1. A process for the production of transportable and storable gelatin capsules which are unaffected by gastric juices and soluble in the small intestines, comprising coating conventional gelatin capsules filled with an active ingredient or ingredients by spraying with a primary lacquer selected from the group consisting of polyvinyl pyrrolidones with a molecular weight of from $10^4$ to $10^6$, hydroxymethyl propyl cellulose, carboxyvinyl polymers with a molecular weight of about $2 \times 10^6$, and mixtures thereof, and thereafter coating said primary lacquer with a lacquer unaffected by gastric juices and soluble in intestinal juices.

2. A process as defined in claim 1, wherein the primary lacquer is sprayed on in a quantity of from 0.1 to 10 mg. per capsule.

0. The process as defined in claim 1, wherein the lacquer unaffected by gastric juices is a cellulose acetate phthalate lacquer.

4. A transportable and storable gelatin capsule filled with an active ingredient or ingredients which is unaffected by gastric juices and soluble in the small intestines wherein said gelatin capsule has a two-layer lacquer coating thereon comprising a primary lacquer selected from the group consisting of polyvinyl pyrrolidone having a molecular weight of from about $10^4$ to $10^6$, hydroxymethyl propyl cellulose, a carboxyvinyl polymer with a molecular weight of about $2 \times 10^6$, and mixtures thereof, and a secondary lacquer on said primary lacquer, said secondary lacquer being a cellulose acetate phthalate lacquer.

* * * * *